(12) United States Patent
Mizutani et al.

(10) Patent No.: US 10,708,453 B2
(45) Date of Patent: Jul. 7, 2020

(54) DISPLAY APPARATUS, NON-TRANSITORY STORAGE MEDIUM STORING INSTRUCTIONS READABLE BY THE DISPLAY APPARATUS, METHOD OF DISPLAYING PRINT IMAGE ON DISPLAY OF THE DISPLAY APPARATUS

(71) Applicant: Brother Kogyo Kabushiki Kaisha, Nagoya-shi, Aichi-ken (JP)

(72) Inventors: Aiko Mizutani, Nagoya (JP); Ryo Yasui, Nagoya (JP); Jun Komura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/266,760

(22) Filed: Feb. 4, 2019

(65) Prior Publication Data
US 2019/0245990 A1  Aug. 8, 2019

(30) Foreign Application Priority Data
Feb. 5, 2018  (JP) .................. 2018-018058

(51) Int. Cl.
*H04N 1/00* (2006.01)
*G06K 19/06* (2006.01)
*G06F 3/12* (2006.01)

(52) U.S. Cl.
CPC .......... *H04N 1/00411* (2013.01); *G06F 3/12* (2013.01); *G06F 3/1204* (2013.01); *G06F 3/125* (2013.01); *G06F 3/1256* (2013.01); *G06F 3/1284* (2013.01); *G06K 19/06028* (2013.01); *H04N 1/00413* (2013.01)

(58) Field of Classification Search
None
See application file for complete search history.

(56) References Cited

U.S. PATENT DOCUMENTS 4,769,110 A *  9/1988  Ohno ................... B07C 3/18
                                                   156/350
5,159,667 A * 10/1992  Borrey ............... G06K 9/00442
                                                   715/205

(Continued)

FOREIGN PATENT DOCUMENTS

JP  2004-295523 A  10/2004

*Primary Examiner* — Anh-Vinh T Nguyen
(74) *Attorney, Agent, or Firm* — Banner & Witcoff, Ltd.

(57) ABSTRACT

A display apparatus includes a display and a controller that executes a display processing for displaying at least one print image a first or second manner as a display manner. In the first manner, single-page images each containing a one-page-equivalent print image are arranged in a first direction. In the second manner, at least one plural-page image each containing a plurality of one-page-equivalent print images are arranged in a second direction. The controller executes an obtaining processing for obtaining setting information for printing to be performed by a printer. In the display processing, the controller determines the display manner to one of the first manner and the second manner and displays the print image on the display in accordance with a setting in a specific item for the setting information obtained in the obtaining processing.

10 Claims, 8 Drawing Sheets

(56) References Cited

U.S. PATENT DOCUMENTS

| | | | |
|---|---|---|---|
| 5,521,710 A * | 5/1996 | Strossman | G06F 3/1296 358/296 |
| 6,042,280 A * | 3/2000 | Yamaguchi | B26D 5/00 400/120.16 |
| 6,172,688 B1 * | 1/2001 | Iwasaki | B41J 3/4075 347/2 |
| 6,205,452 B1 * | 3/2001 | Warmus | G06F 17/21 715/246 |
| 7,782,211 B2 * | 8/2010 | Yamaguchi | G06K 19/07718 156/264 |
| 7,841,790 B2 * | 11/2010 | Yamaguchi | B41J 15/044 400/76 |
| 8,025,451 B2 * | 9/2011 | Yamaguchi | B41J 3/4075 400/120.01 |
| 8,082,495 B2 * | 12/2011 | Nose | B41J 3/4075 715/252 |
| 9,440,464 B2 * | 9/2016 | Kako | B41J 11/666 |
| 10,093,089 B2 * | 10/2018 | Kanda | B41J 2/04536 |
| 10,525,747 B2 * | 1/2020 | Inoue | B41J 3/4075 |
| 2004/0211521 A1 * | 10/2004 | Miyasaka | B41J 11/666 156/384 |
| 2005/0147379 A1 * | 7/2005 | Cuttner | G11B 20/00086 386/245 |
| 2006/0204304 A1 * | 9/2006 | Hioki | B41J 3/4075 400/76 |
| 2006/0222431 A1 * | 10/2006 | Kato | B41J 3/4075 400/621 |
| 2006/0263132 A1 * | 11/2006 | Yamamoto | B41J 3/4075 400/62 |
| 2007/0100672 A1 * | 5/2007 | McBrida | G06Q 10/025 705/6 |
| 2008/0074697 A1 * | 3/2008 | Sawada | B41J 3/01 358/1.15 |
| 2008/0093027 A1 * | 4/2008 | Niwa | B41J 3/4075 156/387 |
| 2009/0231621 A1 * | 9/2009 | Kuwahara | B41J 29/02 358/1.15 |
| 2009/0231623 A1 * | 9/2009 | Kuwahara | B41J 29/02 358/1.15 |
| 2010/0060931 A1 * | 3/2010 | Ichikawa | G06Q 10/10 358/1.15 |
| 2012/0324341 A1 * | 12/2012 | Dejean | G06F 40/103 715/243 |
| 2014/0002567 A1 * | 1/2014 | Miyabayashi | B41J 3/4075 347/211 |
| 2014/0347689 A1 * | 11/2014 | Nose | G06F 40/174 358/1.15 |
| 2015/0034715 A1 * | 2/2015 | Moriyama | B41J 11/008 235/375 |
| 2015/0365559 A1 * | 12/2015 | Nakamura | H04N 1/32133 358/3.28 |
| 2016/0335035 A1 * | 11/2016 | Uchida | G06F 3/1211 |
| 2017/0182804 A1 * | 6/2017 | Kako | B41J 11/663 |
| 2017/0182805 A1 * | 6/2017 | Kawai | B41J 13/0009 |
| 2017/0357470 A1 * | 12/2017 | Kouguchi | G03G 15/5087 |
| 2018/0081604 A1 * | 3/2018 | Shirasaka | G06K 15/024 |
| 2018/0170069 A1 * | 6/2018 | Shima | G06F 3/1208 |
| 2018/0359372 A1 * | 12/2018 | Tsuji | G06F 3/1251 |

* cited by examiner

DISPLAY APPARATUS, NON-TRANSITORY STORAGE MEDIUM STORING INSTRUCTIONS READABLE BY THE DISPLAY APPARATUS, METHOD OF DISPLAYING PRINT IMAGE ON DISPLAY OF THE DISPLAY APPARATUS

CROSS REFERENCE TO RELATED APPLICATION

The present application claims priority from Japanese Patent Application No. 2018-018058, which was filed on Feb. 5, 2018, the disclosure of which is herein incorporated by reference in its entirety.

BACKGROUND

The following disclosure relates to a display apparatus capable of displaying a print image on a display in the case where the display apparatus creates print data to be used for a printer to perform printing, to a non-transitory storage medium storing a plurality of instructions readable by a computer of the display apparatus, and to a method of displaying the print image on the display of the display apparatus.

There is known an apparatus capable of controlling a display to display a print image for a label to be created by printing on a printing medium. For example, there is known a bar-code-image creator. The bar-code-image creator is capable of displaying a plurality of bar-code images on a display in a first arrangement manner or a second arrangement manner as an arrangement manner. In the first arrangement manner, the bar-code images are arranged substantially on a straight line along a direction parallel with the long sides of the respective bar-code images. In the second arrangement manner, the bar-code images are arranged substantially on a straight line along a direction parallel with the short sides of the respective bar-code images. It is noted that a user can select and set the first arrangement manner or the second arrangement manner on a screen displayed by selection of an arrangement menu.

SUMMARY

In the above-described apparatus, the user needs to select and set an appropriate arrangement manner in accordance with print settings such as the type of the printing medium and an image region, resulting in complicated operations.

Accordingly, an aspect of the disclosure relates to a display apparatus capable of determining an appropriate arrangement manner for a print image and displaying the print image on a display, to a non-transitory storage medium storing a plurality of instructions readable by a computer of the display apparatus, and to a method of displaying the print image on the display of the display apparatus.

In one aspect of the disclosure, a display apparatus includes: a display including a display screen; and a controller configured to execute: a display processing in which the controller displays at least one print image on the display screen in any one of a first manner and a second manner as a display manner, a print image representing a label to be created by a printer performing printing on a printing medium, the first manner being a manner in which a plurality of single-page images each containing a one-page-equivalent print image are arranged in a first direction of the display screen, the second manner being a manner in which at least one plural-page image each containing a plurality of one-page-equivalent print images each as the one-page-equivalent print image are arranged in a second direction orthogonal to the first direction; and an obtaining processing in which the controller obtains setting information for printing to be performed by the printer. The controller is configured to, in the display processing, determine the display manner to one of the first manner and the second manner and display the print image on the display screen, in accordance with a setting in a specific item for the setting information obtained in the obtaining processing.

Another aspect of the disclosure relates to a non-transitory storage medium storing a plurality of instructions readable by a computer of a display apparatus. The display apparatus includes a display including a display screen. When executed by the computer, the plurality of instructions cause the display apparatus to execute: a display processing in which the display apparatus displays at least one print image on the display screen in any one of a first manner and a second manner as a display manner, a print image representing a label to be created by a printer performing printing on a printing medium, the first manner being a manner in which a plurality of single-page images each containing a one-page-equivalent print image are arranged in a first direction of the display screen, the second manner being a manner in which at least one plural-page image each containing a plurality of one-page-equivalent print images each as the one-page-equivalent print image are arranged in a second direction orthogonal to the first direction; and an obtaining processing in which the display apparatus obtains setting information for printing to be performed by the printer. When executed by the computer, the plurality of instructions cause the display apparatus to, in the display processing, determine the display manner to one of the first manner and the second manner and display the print image on the display screen, in accordance with a setting in a specific item for the setting information obtained in the obtaining processing.

Yet another aspect of the disclosure relates to a method of displaying a print image on a display of a display apparatus. The method includes: a display step of displaying at least one print image on a display screen of the display in any one of a first manner and a second manner as a display manner, a print image representing a label to be created by a printer performing printing on a printing medium, the first manner being a manner in which a plurality of single-page images each containing a one-page-equivalent print image are arranged in a first direction of the display screen, the second manner being a manner in which at least one plural-page image each containing a plurality of one-page-equivalent print images each as the one-page-equivalent print image are arranged in a second direction orthogonal to the first direction; and an obtaining step of obtaining setting information for printing to be performed by the printer. The display step includes determining the display manner to one of the first manner and the second manner and displaying the print image on the display screen, in accordance with a setting in a specific item for the setting information obtained in the obtaining step.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENT

Overall Configuration of Printing System 1

Figure 1:
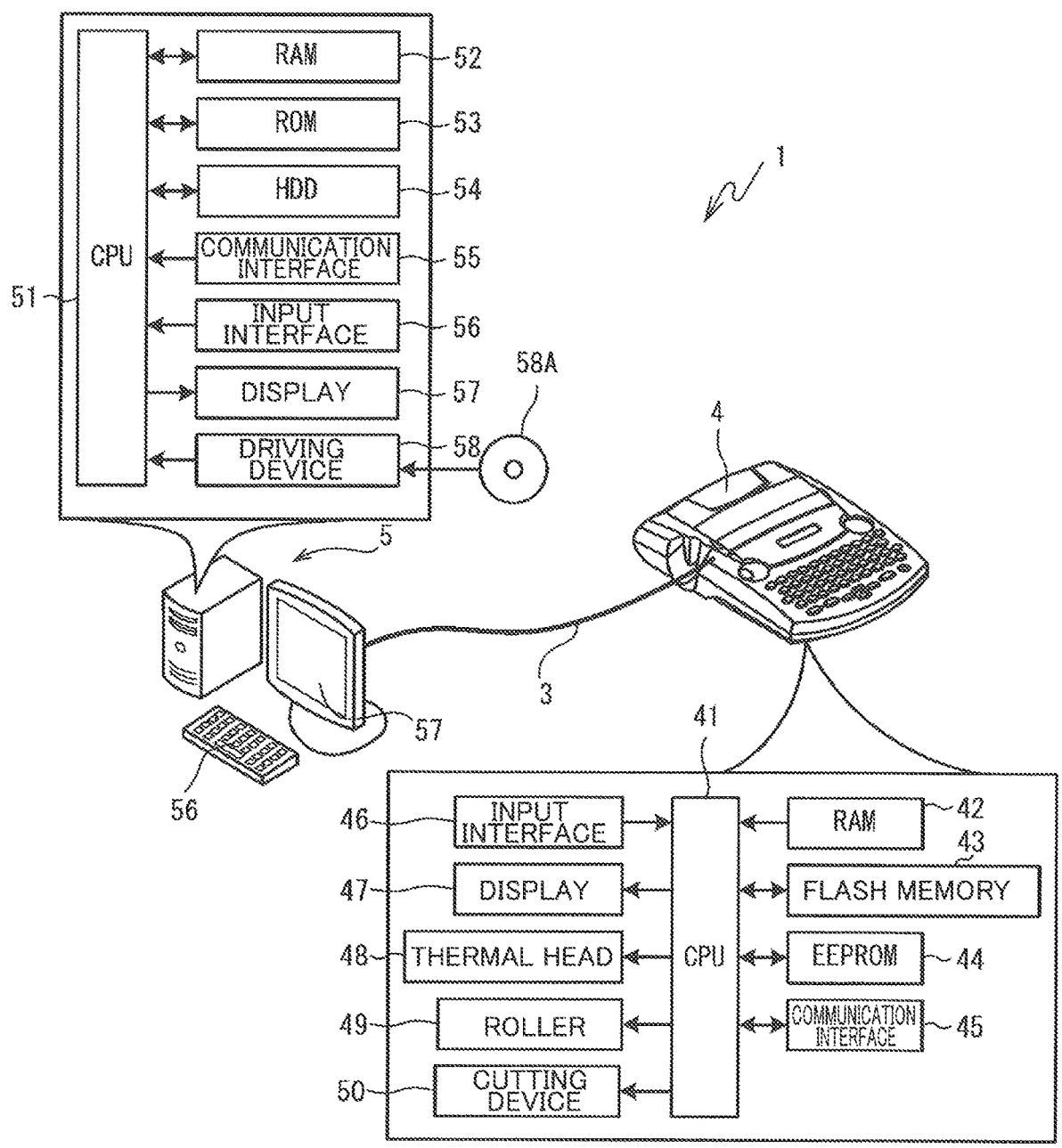
FIG. 1 is a view of a general configuration of a printing system.

Hereinafter, there will be described one embodiment by reference to the drawings. An overall configuration of a printing system 1 will be described with reference to FIG. 1. The printing system 1 includes a printer 4 and a PC 5. The printer 4 is a tape printer configured to perform printing on a tape as one example of a printing medium. The tape is an elongated tape in which a thermal paper sheet is stuck to a release paper sheet by adhesive. A roll of the tape is installed in the printer 4. The printer 4 draws the tape from the installed roll and controls a thermal head 48 to form a multiplicity of dots on the tape to perform printing. The printer 4 controls a cutting device 50 to cut the printed tape. These operations form a label on which characters and/or symbols (hereinafter may be referred to as "print characters") are printed on the tape. The PC 5 is a general-purpose personal computer. The printer 4 and the PC 5 are connected to each other by a cable 3, allowing communication therebetween.

The PC 5 is capable of executing an edit/display program which will be described below. When the edit/display program is executed, the PC 5 can edit the print characters. The PC 5 is capable of displaying a print image representing a label to be created by the printer 4, on a display screen of a display 57 per page of the label. The PC 5 creates print data to be used for printing performed by the printer 4, and transmits the created print data to the printer 4 via the cable 3. The printer 4 can create a label by performing printing based on the print data transmitted from the PC 5.

There will be next described an electric configuration of the printer 4. The printer 4 includes a CPU 41, a RAM 42, a flash memory 43, an EEPROM 44, a communication interface 45, an input interface 46, a display 47, the thermal head 48, a roller 49, and the cutting device 50. The CPU 41 controls the printer 4. The CPU 41 is electrically connected to the RAM 42, the flash memory 43, the EEPROM 44, the communication interface 45, the input interface 46, the display 47, the thermal head 48, the roller 49, and the cutting device 50. The RAM 42 stores various kinds of temporary data. The flash memory 43 stores (i) programs to be executed by the CPU 41 to control the printer 4, and (ii) the print data received from the PC 5. The EEPROM 44 stores dot-pattern data for printing of the print characters such that the dot-pattern data is classified according to their front and size, for example. The communication interface 45 is a controller configured to communicate with the PC 5. The input interface 46 is a keyboard. The display 47 is an LCD. The thermal head 48 is heated based on a signal received from the CPU 41 to perform printing on the tape. The roller 49 is a tape conveying roller configured to convey the tape.

The cutting device 50 includes a cutter provided on a movable cutter holder and configured to cut the tape on which the print characters are printed. The cutting device 50 is capable of cutting the tape in different cutting methods by adjusting an amount of protrusion of the cutter with respect to the cutter holder. One of the cutting methods is full cut for fully cutting the thermal paper sheet and the release paper sheet by using the cutter to cut the thermal paper sheet and the release paper sheet from a front-surface-side across their thickness extending from a thermal-paper-sheet-side surface (a front surface) of the tape to a release-paper-sheet-side surface (a back surface) of the tape. The other of the cutting methods is half cut using the cutter to cut the tape such that the thermal paper sheet is cut across its thickness from a front-surface side and such that a portion or the entirety of the release paper sheet is not cut in its thickness direction.

There will be next described an electric configuration of the PC 5. The PC 5 includes a CPU 51, a RAM 52, a ROM 53, an HDD 54, a communication interface 55, an input interface 56, the display 57, and a driving device 58. The CPU 51 controls the PC 5. The CPU 51 is electrically connected to the RAM 52, the ROM 53, the HDD 54, the communication interface 55, the input interface 56, the display 57, and the driving device 58. The RAM 52 stores various kinds of temporary data. The ROM 53 stores a BIOS and other data. The HDD 54 stores an OS and the edit/display program to be executed for the CPU 51 to control the PC 5. The communication interface 55 is a controller for communicating with the printer 4. Though not illustrated specifically, the input interface 56 includes a keyboard and a pointing device such as a mouse and a touchpad. The display 57 is an LCD. The driving device 58 is configured to read information stored in a storage medium 58A readable by a computer, such as a semiconductor memory and an optical disc. The CPU 51 controls the driving device 58 to read a display program stored in the storage medium 58A and store the read display program into the HDD 54.

Edit/Display Application

Figure 2:
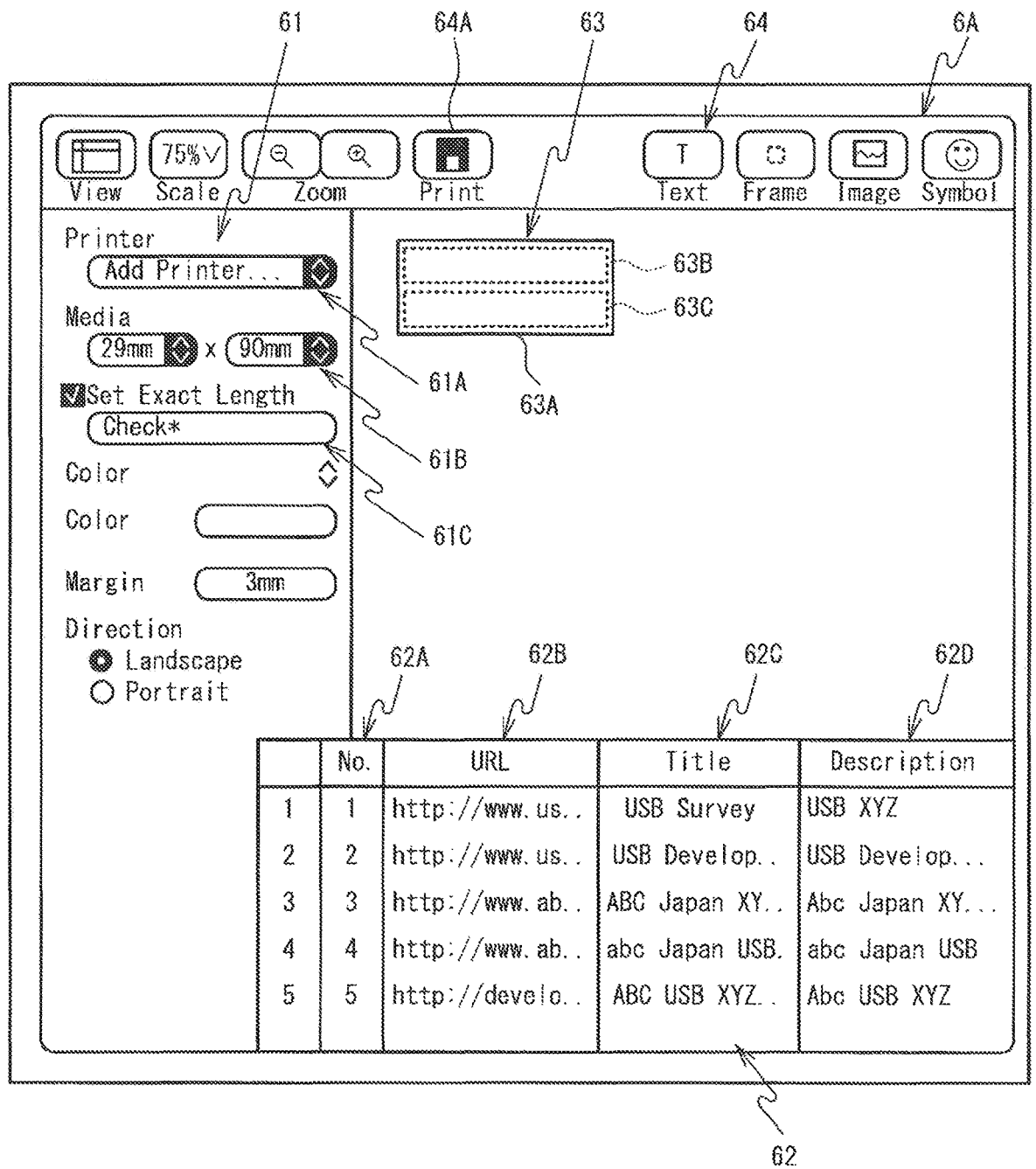
FIG. 2 is a view of a window.

There will be next described an edit/display application which is executed by the PC 5 (see FIG. 1), with reference to FIGS. 2-6. When an instruction for starting editing of the print characters is input via the input interface 56 (see FIG. 1), the CPU 51 (see FIG. 1) starts the edit/display program stored in the HDD 54 (see FIG. 1) to start the edit/display application. FIG. 2 illustrates a window 6A displayed on the display screen of the display 57 (see FIG. 1) when the edit/display application is started. The window 6A has regions 61, 62, 63, 64.

The region 61 is a region for settings relating to the printer and a label to be created. The region 61 includes selection fields 61A, 61B, 61C. The selection field 61A allows a user to select the type of the printer 4 (see FIG. 1) connected to the PC 5. The selection field 61B allows the user to select the width and the length of the label to be created. For example, the user may select the same dimension as the width of the tape mounted in the printer 4, as the label width and select a dimension suit for the length of the print characters, as the label length. The selection field 61C is selected in the case where information such as the width of the tape mounted in the printer 4 is obtained from the printer 4.

The region 62 is a region for displaying a table, based on which the print characters are to be created. The table contains a plurality of records. Each of the records includes field data corresponding respectively to a column 62A (No.), a column 62B (URL), a column 62C (Title), and a column 62D (Description), and so on. In the present embodiment, each of the field data is constituted by a character string including a plurality of characters. Left ends of the records are attached respectively with numbers in descending order (hereinafter each may be referred to as "index"). Hereinafter, the records with the respective indexes 1-5 may be referred to as "records [1]-[5]".

The region 63 is a region for editing of a layout of the print characters on the label. A label image 63A representing an outer shape of a label for one page is displayed on the region 63. Edit-region frames 63B, 63C are disposed on the label image 63A. Each of the edit-region frames 63B, 63C is associated with any of the columns 62A-62D displayed on the region 62. In the case where the printer 4 creates a label based on the label image 63A, the field data in the column corresponding to the record displayed on the region 62 is inserted into each of the edit-region frames 63B, 63C. The printer 4 creates a label by printing the print characters on the tape based on the inserted field data.

In the case where one record (e.g., the record [1]) is selected to create a label in the above-described example, the printer 4 creates a label for one page in which the field data corresponding to the selected record [1] is inserted. In the case where a plurality of records (e.g., the records [1]-[5]) are selected to create the label, the printer 4 is capable of creating labels for five pages in which the field data correspondingly respectively to the selected records [1]-[5] are inserted. Hereinafter, the labels for five pages created based on the records [1]-[5] may be hereinafter referred to as "labels [1]-[5]".

A plurality of operation buttons for instructions relating to the window 6A are displayed on the region 64. The operation buttons include a print button 64A that is selected when the user instructs the printer 4 to start printing.

Figure 3:
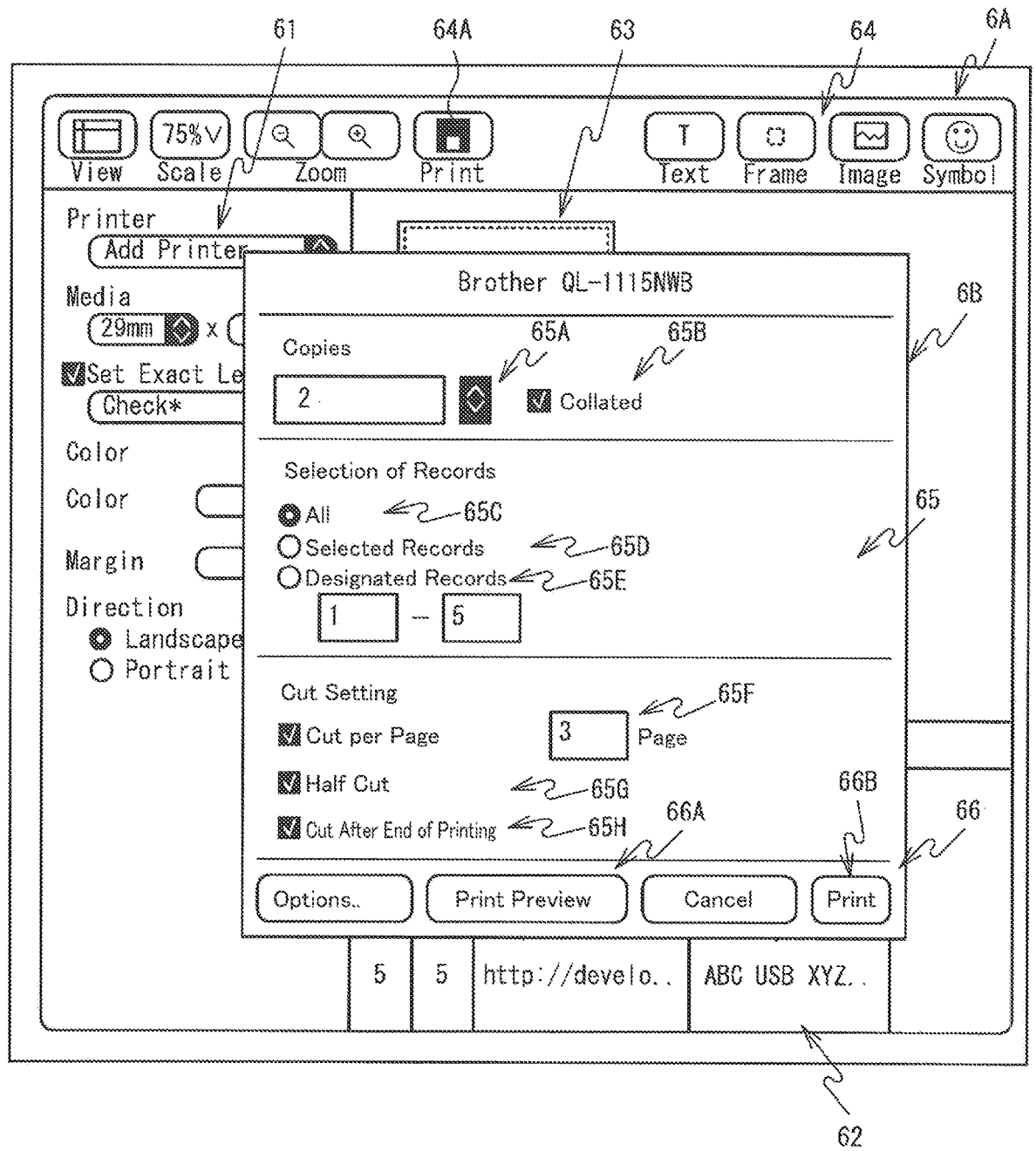
FIG. 3 is a view of the window and a sub-window.

FIG. 3 illustrates a sub-window 6B that is displayed on the display screen when the print button 64A is selected on the window 6A. The sub-window 6B includes regions 65, 66. Setting fields 65A-65H are displayed on the region 65. The user can operate the setting fields 65A-65H to set setting information in the case where the printer 4 performs printing. The setting fields 65A-65H correspond respectively to setting items. Specifically, the setting field 65A corresponds to the number of copies. The setting field 65B corresponds to collating. The setting field 65C corresponds to selection of the records (A11). The setting field 65D corresponds to selection of the records (Selected Records). The setting field 65E corresponds to selection of the records (Designated Records). The setting field 65F corresponds to a cut setting (Cut per Page). The setting field 65G corresponds to a cut setting (Half Cut). The setting field 65H corresponds to a cut setting (Cut After End of Printing).

The setting field 65A (Copies) defines the number of labels created by the printer 4. For example, in the case where the printer 4 creates the label [1] based on the record [1], when "2" is set in the setting field 65A (Copies), the printer 4 prints two labels [1], i.e., labels [1], [1]. For example, in the case where the printer 4 creates the labels [1]-[5] based on the respective records [1]-[5], when "2" is set in the setting field 65A (Copies), the printer 4 creates two sets of the labels [1]-[5], i.e., labels [1], [2], [3], [4], [5], [1], [2], [3], [4], [5].

The setting field 65B (Collated) defines collating of the pages of labels to be created. For example, in the case where the printer 4 creates the labels [1]-[5] based on the respective records [1]-[5], when "2" is set in the setting field 65A (Copies), and the setting field 65B (Collated) is not checked (ineffective), the printer 4 creates labels [1], [1], [2], [2], [3], [3], [4], [4], [5], [5] in this order. When the setting field 65B (Collated) is checked (effective), the printer 4 creates labels [1], [2], [3], [4], [5], [1], [2], [3], [4], [5] in this order.

The setting fields 65C-65E (Selection of Records) define records which are referred to in creation of labels. Any one of the setting fields 65C-65E is checked and selected. In the case where the setting field 65C (A11) is checked, all the records contained in the table displayed on the region 62 are referred to for creating labels. In the case where the setting field 65D (Selected Records) is checked, ones of the records contained in the table displayed on the region 62, which ones are selected by the user having performed an input operation on the input interface 56, are referred to for creating labels. In the case where the setting field 65E (Designated Records) is checked, ones of the records contained in the table displayed on the region 62, which ones correspond to a range of the indexes input via the input interface 56, are referred to for creating labels.

The setting fields 65F-65H (Cut Setting) define cutting conditions for the cutting device 50 of the printer 4. The setting field 65F (Cut per Page) defines the number of pages in the case where the tape is fully cut for each page or each set of pages of the labels. For example, in the case where the printer 4 creates the labels [1]-[5] based on the respective records [1]-[5], when "3" is set in the setting field 65A (Copies), and the setting field 65B (Collated) is not checked, the printer 4 creates labels [1], [1], [1], [2], [2], [2], [3], [3], [3], [4], [4], [4], [5], [5], [5] in this order. Here, in the case where "3" is set in the setting field 65F (Cut per Page), the printer 4 fully cuts the tape so as to create labels [1], [1], [1]/[2], [2], [2]/[3], [3], [3]/[4], [4], [4]/[5], [5], [5]. Here, "I" indicates a position at which the tape is to be fully cut.

The setting field 65G (Half Cut) defines whether half cut is performed to cut the tape for each label for one page in creation of labels. For example, in the case where the setting field 65G (Half Cut) is checked in the above-described example, the printer 4 performs half cut of the tape so as to create labels [1]/[1]/[1]/[2]/[2]/[2]/[3]/[3]/[3]/[4]/[4]/[4]/[5]/[5]/[5]. Here, "I" indicates a position at which half cut is performed for the tape.

The setting field 65H (Cut After End of Printing) defines whether full cut is performed to cut the tape to separate the created labels from the tape. For example, in the case where the setting field 65H (Cut After End of Printing) is checked in the above-described example, the printer 4 performs full cut to separate labels from the tape after printing for the last label [5].

A plurality of operation buttons for instructions relating to the sub-window 6B are displayed on the region 66. The displayed operation buttons include: a preview button 66A that is selected when the user instructs displaying of a print preview; and a print button 66B that is selected when the user instructs the printer 4 to start printing.

Figure 4:
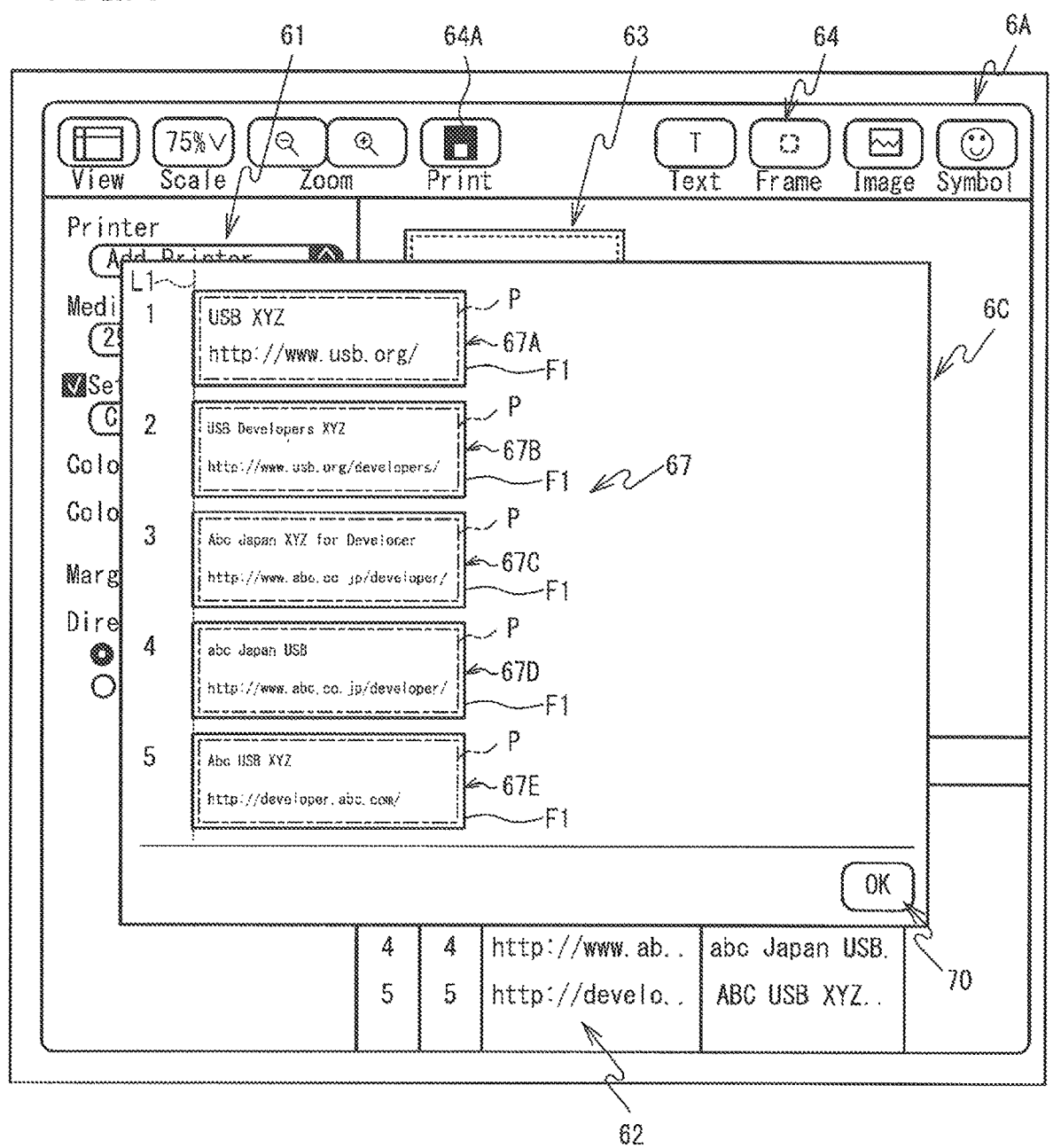
FIG. 4 is a view of the window and a preview window displayed in a first manner.
Figure 5:
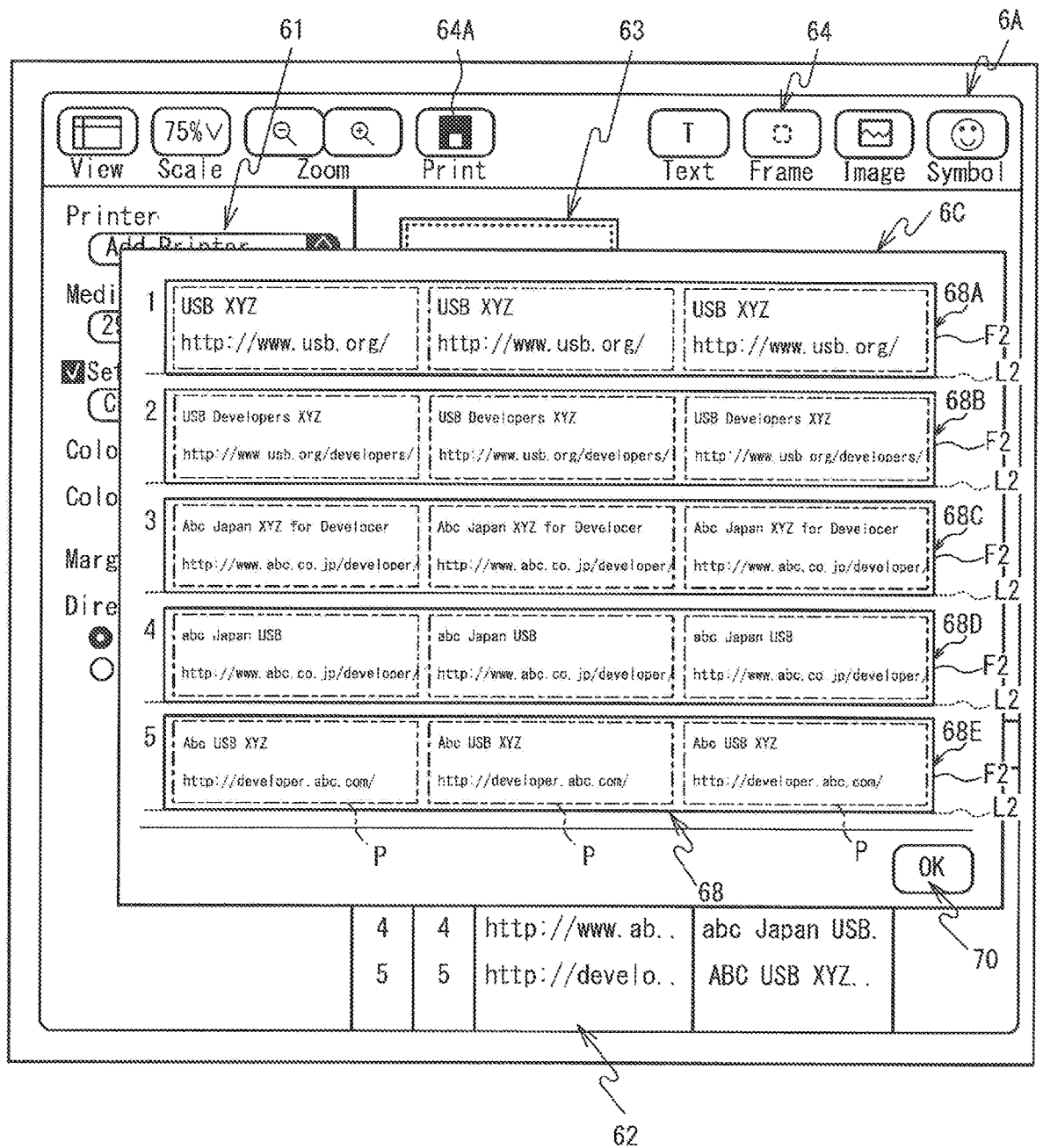
FIG. 5 is a view of the window and the preview window displayed in a second manner.
Figure 6:
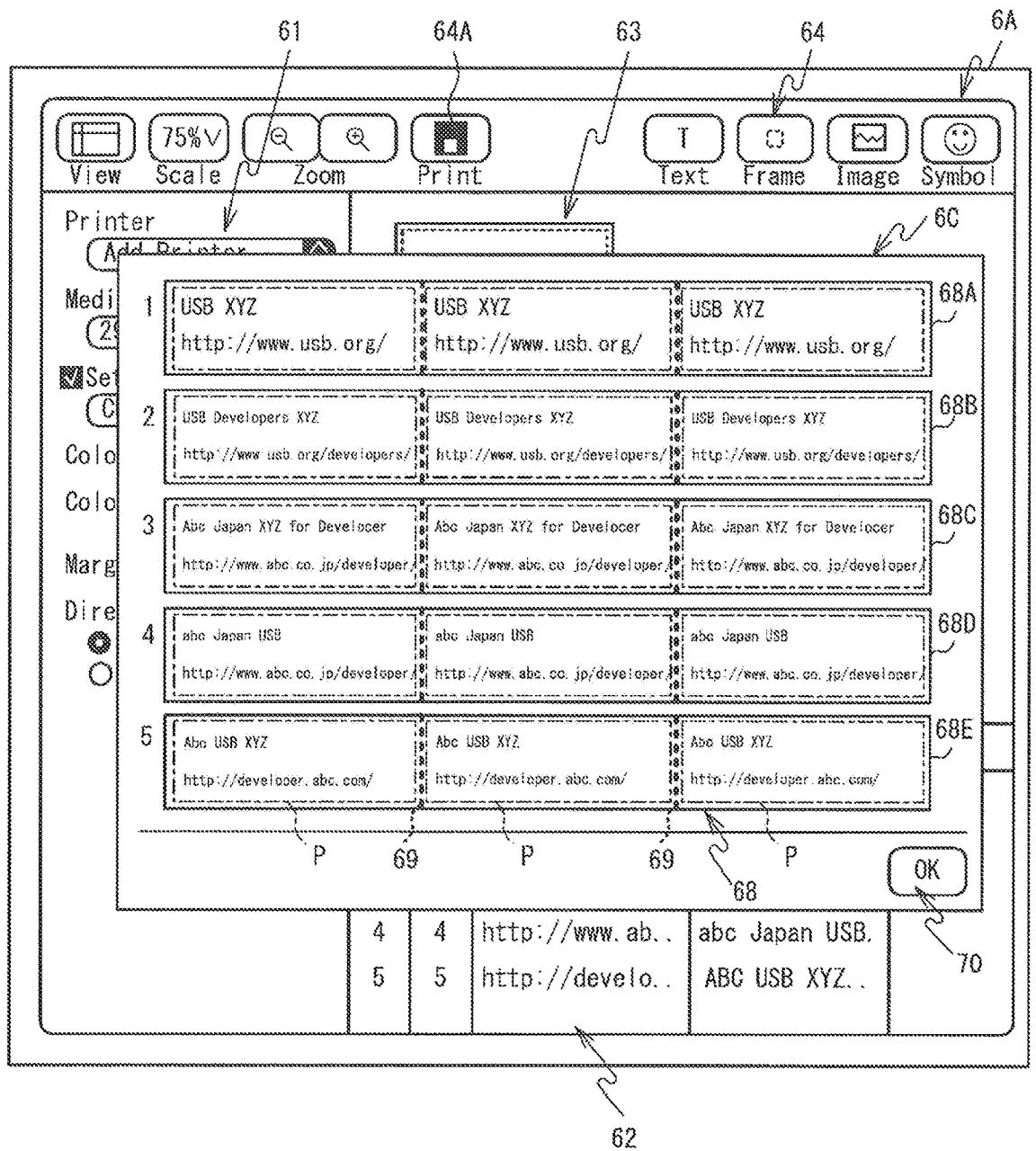
FIG. 6 is a view of the window and the preview window displayed in the second manner with broken lines.

FIGS. 4-6 illustrate a preview window 6C that is displayed on the display screen instead of the sub-window 6B in the case where the preview button 66A (see FIG. 3) is selected on the sub-window 6B. The preview window 6C displays one or a plurality of print images each for one page of a label (hereinafter may be referred to as "one-page-equivalent print images") to cause the user to recognize how the printer 4 prints the print images on the tape to create labels. The preview window 6C further includes an OK button 70 that is selected when the preview window 6C is closed.

Each of the one-page-equivalent print images is determined by inserting the field data into the respective edit-region frames 63B, 63C (see FIG. 2) of the label image 63A (see FIG. 2) displayed on the window 6A (see FIG. 2). It is noted that, since the field data contains a character string constituted by a plurality of characters, the one-page-equivalent print image also contains a character string for each of the edit-region frames 63B, 63C. The characters constituting the character string are arranged in the right and left direction in a state in which the one-page-equivalent print images are displayed on the preview window 6C.

The display manner of the preview window 6C is switched in accordance with settings corresponding to the setting information in the setting field 65F (Cut per Page) and the setting field 65G (Half Cut) displayed on the sub-window 6B (see FIG. 3). Specifically, the display manner is switched as described below. Hereinafter, the display manner of the preview window 6C illustrated in FIG. 4 may be referred to as "first manner", and the display manner of the preview window 6C illustrated in FIGS. 5 and 6 may be referred to as "second manner".

The preview window 6C in the first manner illustrated in FIG. 4 is displayed in the case where "1" is set in the setting field 65F (Cut per Page) as the number of pages. The preview window 6C contains single-page images 67A-67E (hereinafter may be collectively referred to as "single-page image 67"). The single-page images 67A-67E are arranged in the up and down direction. The single-page image 67 contains a rectangular frame line F1. The size of the frame line F1 is determined in accordance with the label width and the label length selected in the selection field 61B displayed on the window 6A (see FIG. 2). The left side (left end) of the frame line F1 of each of the single-page images 67A-67E is disposed on a first imaginary line L1 disposed on a left portion of the preview window 6C and extending in the up and down direction. The single-page image 67 contains a one-page-equivalent print image. The frame line F1 contained in the single-page image 67 indicates the size of the one-page-equivalent print image. A detailed explanation will be given below. It is assumed that "1" is set in the setting field 65A (Copies) (see FIG. 3), and "1-5" is set in the setting field 65E (Designated Records) (see FIG. 3). In the case where the printer 4 is operated based on this setting information, labels [1]/[2]/[3]/[4]/[5] are created. It is noted that the first imaginary line L1 is not displayed on the preview window 6C in reality, but FIG. 4 illustrates the first imaginary line L1 for easier understanding purposes. In the case where the entire preview window 6C is displayed in gray, and the single-page image 67 is displayed in white, for example, the frame line F1 may not be displayed. While a rectangular print frame P indicating a printable region is indicated by a one-dot chain line so as to be enclosed by the frame line F1, this print frame P may not be displayed.

The single-page image 67A contains a one-page-equivalent print image corresponding to the label [1] in which the field data corresponding to the record [1] is inserted. The single-page image 67B contains a one-page-equivalent print image corresponding to the label [2] in which the field data corresponding to the record [2] is inserted. The single-page image 67C contains a one-page-equivalent print image corresponding to the label [3] in which the field data corresponding to the record [3] is inserted. The single-page image 67D contains a one-page-equivalent print image corresponding to the label [4] in which the field data corresponding to the record [4] is inserted. The single-page image 67E contains a one-page-equivalent print image corresponding to the label [5] in which the field data corresponding to the record [5] is inserted.

The preview window 6C in the second manner illustrated in FIG. 5 is displayed in the case where a plural number (e.g., "3") is set in the setting field 65F (Cut per Page). The preview window 6C in the second manner contains plural-page images 68A-68E (hereinafter may be collectively referred to as "plural-page image 68"). The plural-page images 68A-68E are arranged in the up and down direction.

The plural-page image 68 contains three one-page-equivalent print images arranged in the right and left direction and continuous to each other in accordance with the setting ("3") in the setting field 65F (Cut per Page). In the plural-page image 68, the lower side (lower end) of the frame line F1 of each of the one-page-equivalent print images is disposed on a second imaginary line L2 extending in the right and left direction. A detailed explanation will be given below. It is assumed that "3" is set in the setting field 65A (Copies), "1-5" is set in the setting field 65E (Designated Records), and the setting field 65B (Collated) (see FIG. 3) is not checked. In the case where the printer 4 is operated based on this setting information, labels [1], [1], [1]/[2], [2], [2]/[3], [3], [3]/[4], [4], [4]/[5], [5], [5] are created. It is noted that the second imaginary line L2 is not displayed on the preview window 6C in reality like the first imaginary line L1, but FIG. 5 illustrates the second imaginary line L2 for easier understanding purposes. The frame lines F1 for the respective one-page-equivalent print images contained in the plural-page image 68 are not displayed, and a frame line F2 enclosing the entire plural-page image 68 and connecting the frame lines F1 for the respective one-page-equivalent print images to each other is displayed. Thus, the single-page image 67 may contain the frame line F1 (as one example of a first frame line) indicating the size of the print image as illustrated in FIG. 4, and the plural-page image 68 may contain the frame line F2 (as one example of a second frame line) indicating the size of the print image as illustrated in FIG. 5. Also in this case, the lower sides of the respective frame line F2 are arranged on the second imaginary line L2. The second imaginary line L2 is displayed at a position in accordance with the size of the preview window 6C and the label width selected in the selection field 61B. It is noted that the upper side of the frame line F2 may be disposed on the second imaginary line L2 instead of the lower side of the frame line F2. In the case where the entire preview window 6C is displayed in gray, and the plural-page image 68 is displayed in white, for example, the frame line F2 may not be displayed. The print frames P are displayed by one-dot chain lines so as to be enclosed by the frame line F2 but may not be displayed.

The plural-page image 68A contains three one-page-equivalent print images in a state in which the one-page-equivalent print images each corresponding to the label [1] in which the field data corresponding to the record [1] is inserted are arranged in the right and left direction (labels [1], [1], [1]). The plural-page image 68B contains three one-page-equivalent print images in a state in which the one-page-equivalent print images each corresponding to the label [2] in which the field data corresponding to the record [2] is inserted are arranged in the right and left direction (labels [2], [2], [2]). The plural-page image 68C contains three one-page-equivalent print images in a state in which the one-page-equivalent print images each corresponding to the label [3] in which the field data corresponding to the record [3] is inserted are arranged in the right and left direction (labels [3], [3], [3]). The plural-page image 68D contains three one-page-equivalent print images in a state in which the one-page-equivalent print images each corresponding to the label [4] in which the field data corresponding to the record [4] is inserted are arranged in the right and left direction (labels [4], [4], [4]). The plural-page image 68E contains three one-page-equivalent print images in a state in which the one-page-equivalent print images each corresponding to the label [5] in which the field data corresponding to the record [5] is inserted are arranged in the right and left direction (labels [5], [5], [5]).

The preview window 6C in the second manner illustrated in FIG. 6 is displayed in the case where the setting field 65G (Half Cut) (see FIG. 3) is checked, that is, in the case where the setting field 65G (Half Cut) is set such that half cut is performed for the tape for each label for one page in creation of labels. In the case where it is assumed that settings related to the setting information in the fields other than the setting field 65G (Half Cut) are the same as those on the preview window 6C in the second manner illustrated in FIG. 5, the printer 4 performs half cut so as to create labels [1]|[1]|[1]/[2]|[2]|[2]/[3]|[3]|[3]/[4]|[4]|[4]/[5]|[5]|[5]. This preview window 6C is different from the preview window 6C illustrated in FIG. 5 in that broken lines 69 each extending straight in the up and down direction are displayed such that each of the broken lines 69 is located at a boundary portion between adjacent two of the one-page-equivalent print images in the plural-page image 68 in the right and left direction. In other words, each of the broken lines 69 is displayed at a position at which the right side (right end) and the left side (left end) of the respective frame lines F1 of adjacent two of the one-page-equivalent print images coincide with each other. Each of the broken lines 69 indicates a position at which the printer 4 performs half cut in creation of labels. The broken line 69 may have any type other than the broken line, such as a solid line and a wave line.

Main Process

Figure 7:
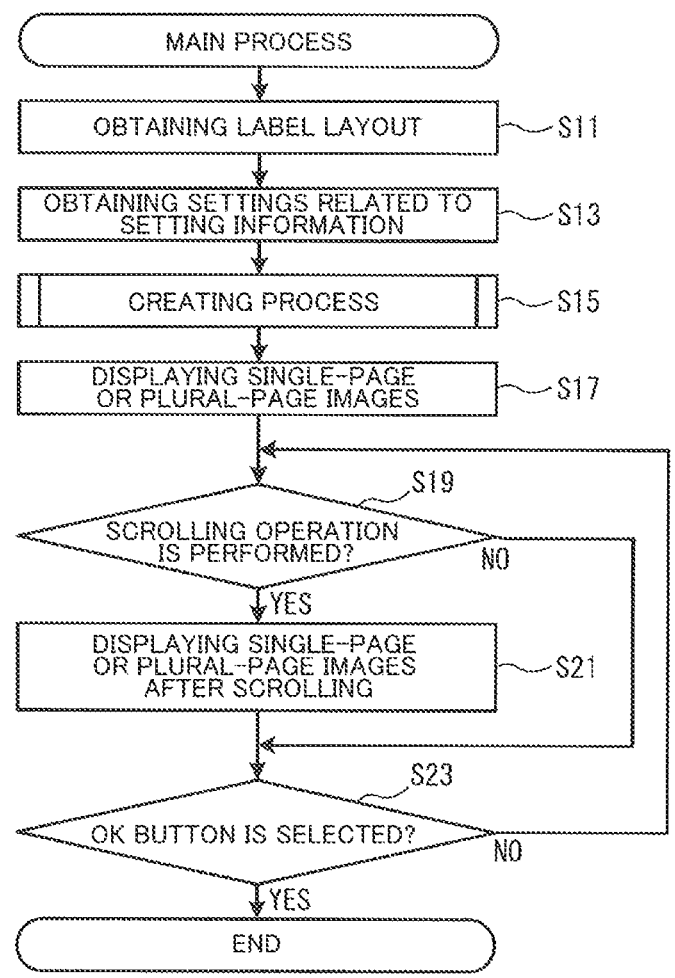
FIG. 7 is a flowchart of a main process.
Figure 8:
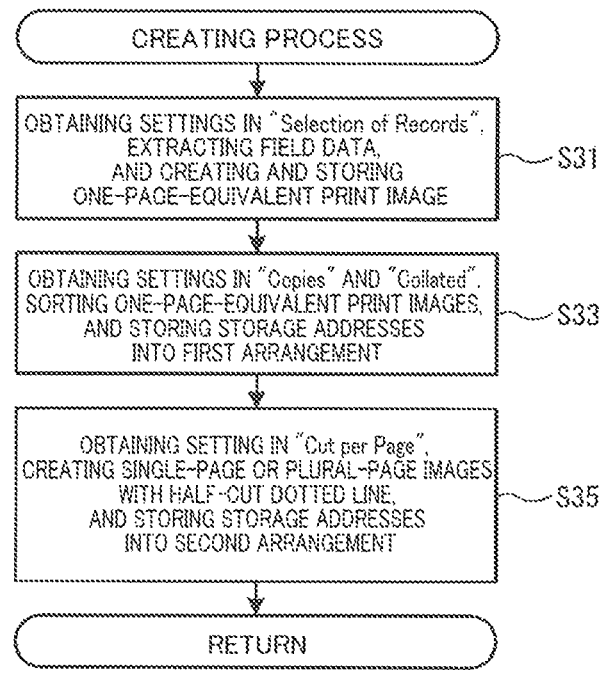
FIG. 8 is a flowchart of a creating process.

There will be next described a main process that is executed by the CPU 51 of the PC 5, with reference to FIGS. 7 and 8. The main process is started by the CPU 51 executing the edit/display program stored in the HDD 54, in the case where the preview button 66A (see FIG. 3) is selected in the state in which the sub-window 6B (see FIG. 3) is displayed on the display screen. The main process corresponds to processings for displaying the preview window 6C illustrated in FIGS. 4-6 on the display screen.

As illustrated in FIG. 7, the CPU 51 at S11 obtains information relating to a layout of the print characters which is set in the region 63 of the window 6A (see FIG. 2). This information may be hereinafter referred to as "label-layout information". The label-layout information includes information relating to the columns 62A-62D (see FIG. 2) associated with each of the edit-region frames 63B, 63C (see FIG. 2). The CPU 51 at S13 obtains settings related to the setting information which are set via the sub-window 6B (see FIG. 3). The CPU 51 at S15 executes a creating process (see FIG. 8), which will be described below, based on the obtained settings related to the setting information.

There will be next described the creating process with reference to FIG. 8. The CPU 51 at S31 obtains settings in the setting fields 65C-65E (Selection of Records) among the settings related to the setting information obtained at S13 (see FIG. 7). The CPU 51 at S31 extracts field data to be contained in labels, from the records based on the label-layout information obtained at S11. The CPU 51 at S31 creates a one-page-equivalent print image for each of the records. The CPU 51 at S31 stores the created one-page-equivalent print images into the RAM 52.

The CPU 51 at S33 obtains settings in the setting field 65A (Copies) and the setting field 65B (Collated) among the settings related to the setting information which are obtained at S13. Based on the obtained settings, the CPU 51 at S33 sorts storage addresses, in the RAM 52, of the respective one-page-equivalent print images created at S31, in the order of creation of the labels and stores the storage addresses into a first arrangement stored in the RAM 52. In the case where labels [1], [2], [3], [4], [5] (Selection of Records: 1-5, Copies: 1, Collated: not checked) are created, for example, the storage addresses of the one-page-equivalent print images representing the respective labels [1]/[2]/[3]/[4]/[5] are stored in this order in the first arrangement. In the case where labels [1], [1], [1], [2], [2], [2], [3], [3], [3], [4], [4], [4], [5], [5], [5] (Selection of Records: 1-5, Copies: 3, Collated: not checked) are created, for example, the storage addresses of the one-page-equivalent print images representing the respective labels [1], [1], [1], [2], [2], [2], [3], [3], [3], [4], [4], [4], [5], [5], [5] are stored in this order in the first arrangement. In the first arrangement, the storage addresses of the one-page-equivalent print images representing the respective labels are stored in order.

The CPU 51 at S35 obtains the setting in the setting field 65F (Cut per Page) among the settings related to the setting information which are obtained at S13. In the case where "1" is set in the setting field 65F (Cut per Page), the CPU 51 creates the single-page images 67 based on the first arrangement into which the storage addresses are stored at S33, and stores the created single-page images 67 into the RAM 52. Each of the single-page images 67 contains a one-page-equivalent print image. The CPU 51 at S35 sorts storage addresses of the respective created single-page images 67 in the RAM 52, based on the order of creation of the corresponding labels and stores the sorted storage addresses into a second arrangement stored in the RAM 52.

In the case where "2" or a larger number is set in the setting field 65F (Cut per Page), the CPU 51 creates the plural-page images 68 based on the first arrangement into which the storage addresses are stored at S33, and stores the created plural-page images 68 into the RAM 52. Each of the plural-page images 68 contains one-page-equivalent print images corresponding to the number of pages set in the setting field 65F (Cut per Page). In the case where the setting field 65G (Half Cut) is checked, the CPU 51 displays each of the broken lines 69 at a boundary portion between corresponding adjacent two of the one-page-equivalent print images in the plural-page images 68. The CPU 51 at S35 sorts storage addresses of the respective created plural-page images 68 in the RAM 52, based on the order of creation of the corresponding labels and stores the sorted storage addresses into the second arrangement stored in the RAM 52. Upon the completion of this processing, the CPU 51 terminates the creating process and returns to the main process (see FIG. 7).

As illustrated in FIG. 7, after the end of the creating process (S15), the CPU 51 executes a processing at S17. In the case where "1" is set in the setting field 65F (Cut per Page), the CPU 51 determines the single-page images 67 to be displayed on the preview window 6C at this point in time. The CPU 51 at S17 displays the determined single-page images 67 on the preview window 6C based on the second arrangement stored in the RAM 52 (see FIG. 4). In the case where "2" or a larger number is set in the setting field 65F (Cut per Page), the CPU 51 determines the plural-page images 68 to be displayed on the preview window 6C at this point in time. The CPU 51 at S17 displays the determined plural-page images 68 on the preview window 6C based on the second arrangement stored in the RAM 52 (see FIGS. 5 and 6).

The CPU 51 at S19 determines whether an operation for scrolling information on the preview window 6C is input via the input interface 56. When the operation for scrolling is not input (S19: NO), this flow goes to S23. When the operation for scrolling is input (S19: YES), this flow goes to S21. After scrolling the information, the CPU 51 determines the single-page images 67 or the plural-page images 68 to be displayed on the preview window 6C at this point in time. The CPU 51 at S21 displays the determined single-page images 67 or the determined plural-page images 68 on the preview window 6C based on the second arrangement stored in the RAM 52 (see FIGS. 4-6), and this flow goes to S23.

The CPU 51 at S23 determines whether an operation of selecting the OK button 70 (see FIGS. 4-6) displayed on the preview window 6C is input via the input interface 56. When the operation of selecting the OK button 70 is not input (S23: NO), this flow returns to S19. When the operation of selecting the OK button 70 is input (S23: YES), the CPU 51 closes the preview window 6C, and the main process ends.

Effects

The PC 5 at S13 obtains settings related to the setting information for printing to be performed by the printer 4. The PC 5 at S17 and S21 switches the display manner to one of the first manner (see FIG. 4) and the second manner (see FIGS. 5 and 6) based on the obtained settings related to the setting information to display the preview window 6C. The single-page images 67 are displayed on the preview window 6C in the first manner, and the plural-page images 68 are displayed on the preview window 6C in the second manner. This configuration enables the PC 5 to display the one-page-equivalent print images on the preview window 6C in an appropriate display manner related to the setting information. This enables the PC 5 to display the one-page-equivalent print images on the display screen in appropriate arrangement without the need for the user to select a display manner.

The PC 5 switches the display manner based on the setting in the setting field 65F (Cut per Page) which indicates the number of pages in the case where the printer 4 controls the cutting device 50 to fully cuts the tape for each page or each set of pages. Specifically, the PC 5 displays the single-page image 67 on the preview window 6C in the first manner (see FIG. 4) in the case where "1" is set in the setting field 65F (Cut per Page). The PC 5 displays the plural-page image 68 on the preview window 6C in the second manner (see FIGS. 5 and 6) in the case where "2" or a larger number is set in the setting field 65F (Cut per Page). This configuration enables the PC 5 to the one-page-equivalent print images on the display screen for each set of pages of the label in the case where the cutting device 50 fully cuts the tape.

The one-page-equivalent print images corresponding to the number of pages set in the setting field 65F (Cut per Page) are arranged in the right and left direction on the plural-page image 68 to be displayed in the case where "2" or a larger number is set in the setting field 65F (Cut per Page). This configuration enables the PC 5 to display the one-page-equivalent print images on the display screen for each set of pages of the label which are indicated by the setting in the setting field 65F (Cut per Page).

In the first manner, the left sides of the rectangular frame lines F1 of the respective single-page images 67 are arranged on the first imaginary line L1 extending in the up and down direction. This enables the PC 5 to cause the user to recognize the print images for the labels created by fully cutting the tape for each page, such that the print images are clearly distinguished from each other. Also, it is possible for the PC 5 to display a larger number of the single-page images 67 on the preview window 6C so as to arrange the single-page images 67 with enhanced appearance. In the second manner, the one-page-equivalent print images continuous to each other are displayed as the plural-page image 68 such that the lower sides of the rectangular frame lines F1 of the respective one-page-equivalent print images are arranged on the second imaginary line L2 extending in the right and left direction. This enables the PC 5 to cause the user to recognize the print images for the labels created by fully cutting the tape for each set of pages, such that the print images are clearly distinguished from each other. Also, it is possible for the PC 5 to specifically display, on the display screen, a manner in which the labels are created on the elongated tape for respective pages.

The setting field 65G (Half Cut) defines whether the cutting device 50 performs half cut of the tape for each page of the label. In the case where the setting field 65G (Half Cut) is checked, that is, in the case where the printer 4 is set to perform half cut of the tape for each page of the label, the PC 5 displays each of the broken lines at a boundary portion between corresponding adjacent two of the one-page-equivalent print images in the plural-page image 68. This configuration enables the PC 5 to cause the user to recognize a positional relationship between the label and a position of half cut on the tape.

The PC 5 displays the plural-page images 68 arranged in the up and down direction in the case where the preview window 6C is displayed in the second manner. This configuration enables the PC 5 to display the plural-page images 68 on the display screen to cause the user to recognize the plural-page images 68.

In the case where the one-page-equivalent print image contains a character string constituted by a plurality of characters, the characters are displayed on the preview window 6C so as to be arranged in the right and left direction. This configuration enables the PC 5 to align the direction (the right and left direction) of arrangement of the characters of the character string contained in the one-page-equivalent print images, with the direction (the right and left direction) of arrangement of the one-page-equivalent print images displayed in the case where the plural-page image 68 is displayed on the display screen in the second manner. For example, in the case where printing is performed such that the direction of arrangement of the characters of the character string and the elongated direction of the tape coincide with each other, the direction (the right and left direction) of arrangement of the one-page-equivalent print images and the elongated direction of the tape coincide with each other as the right and left direction. This enables the PC 5 to display the plural-page images 68 on the preview window 6C in a manner established in the case where the one-page-equivalent print images are printed on the tape in reality.

Modifications

While the embodiment has been described above, it is to be understood that the disclosure is not limited to the details of the illustrated embodiment, but may be embodied with various changes and modifications, which may occur to those skilled in the art, without departing from the spirit and scope of the disclosure. For example, the main process may be executed by the CPU 41 of the printer 4. In this case, the CPU 41 may display the window 6A, the sub-window 6B, and the preview window 6C on the display 47 of the printer 4.

The CPU 51 of the PC 5 may switch the display manner of the preview window 6C to the first manner or the second manner based on the settings related to the setting information in the fields other than the setting field 65F (Cut per Page). For example, the setting field 65G (Half Cut) may enable input of one or a plurality of pages and define whether the cutting device 50 is to be operated to perform half cut of the tape for each input one or set of pages of the labels. In this case, in the case where the number of pages input to the setting field 65G (Half Cut) is "1", the CPU 51 may display the preview window 6C containing the single-page image 67 in the first manner. In the case where the number of pages input to the setting field 65G (Half Cut) is "2" or a larger number, the CPU 51 may display the preview window 6C containing the plural-page images 68 in the second manner. Alternatively, the setting field 65F (Cut per Page) may define the number of pages in the case where the cutting device 50 performs half cut of the tape for each page or each set of pages of the labels.

The number of the one-page-equivalent print images contained in the plural-page image 68 may not be equal to the number of pages set in the setting field 65F (Cut per Page). For example, the number of the one-page-equivalent print images may be less than the number of pages set in the setting field 65F (Cut per Page). In this case, a portion of the one-page-equivalent print images may not be displayed on the preview window 6C.

In the case where the preview window 6C is displayed in the first manner, the right sides of the frame lines F1 of the respective single-page images 67 may be arranged on the first imaginary line L1 extending in the up and down direction and located on a right portion of the preview window 6C. In the case where the single-page images 67, for example, are different from each other in length in the right and left direction, the first imaginary line L1 may be disposed at the center of the preview window 6C, and the centers of the frame lines F1 of the respective single-page images 67 in the right and left direction may be arranged on the first imaginary line L1.

For example, in the case where the number of pages is not set in the setting field 65F (Cut per Page), and the setting field 65H (Cut After End of Printing) is checked, the PC 5 may determine that the total number of the one-page-equivalent print images are set as the number of pages in the setting field 65F (Cut per Page). In this case, the PC 5 may display the preview window 6C containing only one plural-page image 68. In this case, the one plural-page image 68 may contain all the one-page-equivalent print images.

The preview window 6C may be displayed in a manner in which the preview window 6C is rotated 90 degrees in the clockwise direction with respect to the display screen of the display 57. In this case, the characters constituting the character string contained in the one-page-equivalent print image may be arranged in the up and down direction.

Associations

The PC 5 is one example of a display apparatus. The tape is one example of a printing medium. The up and down direction is one example of a first direction. The right and left direction is one example of a second direction. The processings at S17 and S21 are one example of a display processing. The processing at S13 is one example of an obtaining processing. The item set in the setting field 65F (Cut per Page) for setting the setting information is one example of a first specific item. The setting set in the setting field 65F (Cut per Page) for setting the setting information is one example of a first setting. The processings at S17 and S21 are one example of a display step. The processing at S13 is one example of an obtaining step.

What is claimed is:

1. A display apparatus, comprising:
   a display comprising a display screen; and
   a controller configured to execute:
   an obtaining processing in which the controller obtains setting information for printing to be performed by a printer performing printing on tape;
   a first display processing in which the controller controls the display screen to display a first single-page image and a second single-page image, the first single-page image comprising a first tape-piece image and a first object image displayed on the first tape-piece image and corresponding to a first record contained in a table, the second single-page image comprising a second tape-piece image and a second object image displayed on the second tape-piece image and corresponding to a second record contained in the table, the first object image and the second object image being configured to be printed on an identical tape by the printer, the tape with the first object image printed thereon being configured to be cut by a cutting device of the printer so as to separate the tape in a longitudinal direction of the tape to create a first tape item with the first object image printed thereon, the tape with the second object image printed thereon being configured to be cut by the cutting device of the printer so as to separate the tape in the longitudinal direction of the tape to create a second tape item with the second object image printed thereon, the first tape-piece image with the first object image displayed thereon and the second tape-piece image with the second object image displayed thereon being arranged on the display screen in a first direction corresponding to a widthwise direction of the tape; and
   a second display processing in which the controller controls the display screen to display a first plural-page image and a second plural-page image, the first plural-page image comprising a third tape-piece image and a plurality of the first object images displayed on the third tape-piece image and each corresponding to the first record, the second plural-page image comprising a fourth tape-piece image and a plurality of the second object images displayed on the fourth tape-piece image and each corresponding to the second record, the plurality of the first object images and the plurality of the second object images being configured to be printed on an identical tape by the printer, the tape with the plurality of the first object images printed thereon being configured to be cut by the cutting device of the printer so as to separate the tape in the longitudinal direction of the tape to create a third tape item with the plurality of the first object images printed thereon, the tape with the plurality of the second object images printed thereon being configured to be cut by the cutting device of the printer so as to separate the tape in the longitudinal direction of the tape to create a fourth tape item with the plurality of the second object images printed thereon, the third tape-piece image with the plurality of the first object images displayed thereon and the fourth tape-piece image with the plurality of the second object images displayed thereon being arranged on the display screen in the first direction, the plurality of the first object images being arranged on the display screen in a second direction orthogonal to the first direction and corresponding to the longitudinal direction of the tape, the plurality of the second object images being arranged on the display screen in the second direction,
   wherein the controller is configured to execute one of the first display processing and the second display processing in accordance with a setting in a specific item for the setting information obtained in the obtaining processing.

2. The display apparatus according to claim 1,
wherein the specific item defines the number of object images, based on which the cutting device is configured to cut the tape, and
wherein the controller is configured to: execute the first display processing when the specific item indicates one; and execute the second display processing when the specific item indicates two or more.

3. The display apparatus according to claim 2, wherein the controller is configured to, when the specific item indicates two or more, execute the second display processing in which a number of the first object images which is indicated by the specific item are arranged in the first plural-page image in the second direction, and the number of the second object images which is indicated by the specific item are arranged in the second plural-page image in the second direction.

4. The display apparatus according to claim 2,
wherein a rectangular frame line is disposed for each of the plurality of the first object images and the plurality of the second object images, and the rectangular frame line indicates a size of said each of the plurality of the first object images and the plurality of the second object images, and
wherein the controller is configured to execute:
the first display processing to display the first single-page image and the second single-page image such that one of two sides of the rectangular frame line each extending in the first direction extends on a first imaginary line extending in the first direction; and
the second display processing to display (i) the first plural-page image containing the plurality of the first object images continuous to each other and (ii) the second plural-page image containing the plurality of the second object images continuous to each other, such that one of two sides of the rectangular frame line each extending in the second direction extend on a second imaginary line extending in the second direction.

5. The display apparatus according to claim 2,
wherein a rectangular first frame line is disposed on each of the first single-page image and the second single-page image and the rectangular first frame line indicates a size of said each of the first single-page image and the second single-page image,
wherein a rectangular second frame line is disposed on each of the first plural-page image and the second plural-page image, and the rectangular second frame line indicates a size of said each of the first plural-page image and the second plural-page image, and
wherein the controller is configured to execute:
the first display processing to display the first single-page image and the second single-page image such that one of two sides of the rectangular first frame line each extending in the first direction extends on a first imaginary line extending in the first direction; and
the second display processing to display (i) the first plural-page image containing the plurality of the first object images continuous to each other and (ii) the second plural-page image containing the plurality of the second object images continuous to each other, such that one of two sides of the rectangular second frame line each extending in the second direction extends on a second imaginary line extending in the second direction.

6. The display apparatus according to claim 2,
wherein the setting information comprises a second specific item different from a first specific item as the specific item, and the second specific item defines whether the cutting device is to perform half cut of the tape for each object image or each set of object images, and the half cut is a cutting of only a portion of the tape in a thickness direction of the tape, and
wherein the controller is configured to, when a setting in the second specific item indicates half cut to be performed, execute the second display processing to display a straight line of a particular line type at a boundary portion between an adjacent two of the plurality of the first object images contained in the first plural-page image and between an adjacent two of the plurality of the second object images contained in the second plural-page image.

7. The display apparatus according to claim 1, wherein when each of the plurality of the first object images and the plurality of the second object images comprises a character string constituted by a plurality of characters, the plurality of characters are arranged in the second direction.

8. The display apparatus according to claim 1, wherein the first single-page image and the second single-page image are spaced apart from each other in the first direction, and the first plural-page image and the second plural-page image are spaced apart from each other in the first direction.

9. A non-transitory storage medium storing a plurality of instructions readable by a computer of a display apparatus,
wherein the display apparatus comprises a display comprising a display screen,
wherein when executed by the computer, the plurality of instructions cause the display apparatus to execute:
an obtaining processing in which the display apparatus obtains setting information for printing to be performed by a printer performing printing on a tape;
a first display processing in which the display apparatus controls the display screen to display a first single-page image and a second single-page image, the first single-page image comprising a first tape-piece image and a first object image displayed on the first tape-piece image and corresponding to a first record contained in a table, the second single-page image comprising a second tape-piece image and a second object image displayed on the second tape-piece image and corresponding to a second record contained in the table, the first object image and the second object image being configured to be printed on an identical tape by the printer, the tape with the first object image printed thereon being configured to be cut by a cutting device of the printer so as to separate the tape in a longitudinal direction of the tape to create a first tape item with the first object image printed thereon, the tape with the second object image printed thereon being configured to be cut by the cutting device of the printer so as to separate the tape in the longitudinal direction of the tape to create a second tape item with the second object image printed thereon, the first tape-piece image with the first object image displayed thereon and the second tape-piece image with the second object image displayed thereon being arranged on the display screen in a first direction corresponding to a widthwise direction of the tape; and
a second display processing in which the display apparatus controls the display screen to display a first plural-page image and a second plural-page image, the first plural-page image comprising a third tape-piece image and a plurality of the first object images displayed on the third tape-piece image and each corresponding to the first record, the second plural-page image comprising a fourth tape-piece image and a plurality of the second object images displayed on the fourth tape-piece image and each corresponding to the second record, the plurality of the first object images and the plurality of the second object images being configured to be printed on an identical tape by the printer, the tape with the plurality of the first object images printed thereon being configured to be cut by the cutting device of the printer so as to separate the tape in the longitudinal direction of the tape to create a third tape item with the plurality of the first object images printed thereon, the tape with the plurality of the second object images printed thereon being configured to be cut by the cutting device of the printer so as to separate the tape in the longitudinal direction of the tape to create a fourth tape item with the plurality of the second object images printed thereon, the third tape-piece image with the plurality of the first object images displayed thereon and the fourth tape-piece image with the plurality of the second object images displayed thereon being arranged on the display screen in the first direction, the plurality of the first object images being arranged on the display screen in a second direction orthogonal to the first direction and corresponding to the longitudinal direction of the tape, the plurality of the second object images being arranged on the display screen in the second direction, wherein when executed by the computer, the plurality of instructions cause the display apparatus to execute one of the first display processing and the second display processing in accordance with a setting in a specific item for the setting information obtained in the obtaining processing.

10. A method of displaying a print image on a display of a display apparatus, the method comprising:

an obtaining step of obtaining setting information for printing to be performed by a printer performing printing on a tape;

a first display step of displaying a first single-page image and a second single-page image, the first single-page image comprising a first tape-piece image and a first object image displayed on the first tape-piece image and corresponding to a first record contained in a table, the second single-page image comprising a second tape-piece image and a second object image displayed on the second tape-piece image and corresponding to a second record contained in the table, the first object image and the second object image being configured to be printed on an identical tape by the printer, the tape with the first object image printed thereon being configured to be cut by a cutting device of the printer so as to separate the tape in a longitudinal direction of the tape to create a first tape item with the first object image printed thereon, the tape with the second object image printed thereon being configured to be cut by the cutting device of the printer so as to separate the tape in the longitudinal direction of the tape to create a second tape item with the second object image printed thereon, the first tape-piece image with the first object image displayed thereon and the second tape-piece image with the second object image displayed thereon being arranged on the display screen in a first direction corresponding to a widthwise direction of the tape; and a second display step of displaying a first plural-page image and a second plural-page image, the first plural-page image comprising a third tape-piece image and a plurality of the first object images displayed on the third tape-piece image and each corresponding to the first record, the second plural-page image comprising a fourth tape-piece image and a plurality of the second object images displayed on the fourth tape-piece image and each corresponding to the second record, the plurality of the first object images and the plurality of the second object images being configured to be printed on an identical tape by the printer, the tape with the plurality of the first object images printed thereon being configured to be cut by the cutting device of the printer so as to separate the tape in the longitudinal direction of the tape to create a third tape item with the plurality of the first object images printed thereon, the tape with the plurality of the second object images printed thereon being configured to be cut by the cutting device of the printer so as to separate the tape in the longitudinal direction of the tape to create a fourth tape item with the plurality of the second object images printed thereon, the third tape-piece image with the plurality of the first object images displayed thereon and the fourth tape-piece image with the plurality of the second object images displayed thereon being arranged on the display screen in the first direction, the plurality of the first object images being arranged on the display screen in a second direction orthogonal to the first direction and corresponding to the longitudinal direction of the tape, the plurality of the second object images being arranged on the display screen in the second direction, wherein one of the first display step and the second display step is implemented in accordance with a setting in a specific item for the setting information obtained in the obtaining processing.

\* \* \* \* \*